(12) United States Patent
Benstead

(10) Patent No.: US 10,875,962 B2
(45) Date of Patent: Dec. 29, 2020

(54) POLYAMIDE COPOLYMER AND METHOD OF MAKING THE SAME

(71) Applicant: INVISTA NORTH AMERICA S.A.R.L., Wilmington, DE (US)

(72) Inventor: Michael D. Benstead, Stockton-on-Tees (GB)

(73) Assignee: INVISTA North America S.a.r.l., Wilmington, DE (US)

( * ) Notice: Subject to any disclaimer, the term of this patent is extended or adjusted under 35 U.S.C. 154(b) by 96 days.

(21) Appl. No.: 16/077,309

(22) PCT Filed: Mar. 6, 2017

(86) PCT No.: PCT/US2017/020971
§ 371 (c)(1),
(2) Date: Aug. 10, 2018

(87) PCT Pub. No.: WO2017/155891
PCT Pub. Date: Sep. 14, 2017

(65) Prior Publication Data
US 2019/0048138 A1    Feb. 14, 2019

Related U.S. Application Data

(60) Provisional application No. 62/305,340, filed on Mar. 8, 2016.

(51) Int. Cl.
*C08G 69/28*   (2006.01)
*C08G 69/26*   (2006.01)

(52) U.S. Cl.
CPC .......... *C08G 69/265* (2013.01); *C08G 69/28* (2013.01)

(58) Field of Classification Search
CPC ................................................ C08G 69/265
(Continued)

(56) References Cited

U.S. PATENT DOCUMENTS

| 5,516,882 A | 5/1996 | Soelch |
| 2008/0262193 A1 | 10/2008 | Kurose et al. |

(Continued)

FOREIGN PATENT DOCUMENTS

| WO | 2010/014801 A1 | 2/2010 |
| WO | 2017/155891 A1 | 9/2017 |

OTHER PUBLICATIONS

International Search Report and Written Opinion received for PCT Application No. PCT/US2017/020971, dated Jun. 2, 2017, 12 pages.

(Continued)

*Primary Examiner* — Duc Truong
(74) *Attorney, Agent, or Firm* — Invista North America S.A.R.L.

(57) ABSTRACT

A method of making a polyamide copolymer includes subjecting a reaction mixture to conditions sufficient to form the polyamide copolymer, the reaction mixture including adduct A and adduct B. Adduct A is a 1:1 adduct of a diamine having the structure H2N-R1-NH2, or a salt thereof and an aliphatic diacid having the structure HO—C(O)—R2-C(O)—OH, or a salt thereof. Adduct B is a 1:1 adduct of the diamine having the structure H2N-R1-NH2, or a salt thereof, and an aromatic diacid having the structure HO—C(O)—R3-C(O)—OH, or a salt thereof. At each occurrence, R1 and R2 can be independently a substituted or unsubstituted (C1-C20)alkylene. At each occurrence, R3 can be independently a substituted or unsubstituted (C6-C20)arylene. The molar ratio of adduct A to adduct B in the reaction mixture can be about 61:39 to about 90:10.

14 Claims, 5 Drawing Sheets

(58) Field of Classification Search
USPC .......................................................... 528/339
See application file for complete search history.

(56) References Cited

U.S. PATENT DOCUMENTS

| 2012/0196973 A1 | 8/2012 | Doshi et al. |
| 2013/0253115 A1 | 9/2013 | Jeol et al. |
| 2013/0328144 A1 | 12/2013 | Yoshihara |
| 2013/0328244 A1 | 12/2013 | Chisholm |

OTHER PUBLICATIONS

EP office action for EP application No. 17711532.6, dated May 4, 2020, pp. 7.
First Office action and Search Report received for CN application No. 201780011775.0, dated Sep. 17, 2020, 16 pages (9 pages of English translation and 6 pages of official copy).

POLYAMIDE COPOLYMER AND METHOD OF MAKING THE SAME

CROSS-REFERENCE TO RELATED APPLICATION

This application claims the benefit of priority to U.S. Provisional Patent Application Ser. No. 62/305,340 filed Mar. 8, 2016, the disclosure of which is incorporated herein in its entirety by reference.

BACKGROUND

During production of consecutive batches of hexamethyleneterephthalamide-containing copolymers via melt polymerization, there is a risk of the formation of materials having higher melting points than the maximum temperature used during the melt polymerization reaction, which can lead to significant issues when trying to cast the molten polymer from the autoclave. These high melting point materials are observed when the heel from the previous batch is not fully melted during the subsequent batch, causing heterogeneity in the resulting product.

While base can be added to certain copolymers formed from hexamethyleneterephthalamide to prevent the formation of high melting point materials, this technique is not effective when producing copolymers from hexamethyleneterephthalamide and hexamethyleneadipamide (e.g., 66/6T copolymers).

SUMMARY

In various embodiments, the present disclosure provides a method of making a polyamide copolymer. The method includes subjecting a reaction mixture to conditions sufficient to form the polyamide copolymer. The reaction mixture includes adduct A and adduct B. Adduct A is a 1:1 adduct of a diamine having the structure $H_2N-R-NH_2$, or a salt thereof, and an aliphatic diacid having the structure $HO-C(O)-R^2-C(O)-OH$, or a salt thereof. Adduct B is a 1:1 adduct of the diamine having the structure $H_2N-R^1-NH_2$, or a salt thereof, and an aromatic diacid having the structure $HO-C(O)-R^3-C(O)-OH$, or a salt thereof. At each occurrence, $R^2$ is independently a substituted or unsubstituted $(C_1-C_{20})$alkylene. At each occurrence, $R^2$ is independently a substituted or unsubstituted $(C_1-C_{20})$alkylene. At each occurrence, $R^3$ is independently a substituted or unsubstituted $(C_6-C_{20})$arylene. The molar ratio of adduct A to adduct B in the reaction mixture is about 61:39 to about 90:10. The polyamide copolymer includes repeating units having the structure:

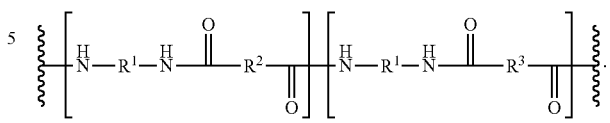

The repeating units are in block or random configuration in the copolymer.

In various embodiments, the present disclosure provides a method of making a polyamide copolymer. The method includes subjecting a reaction mixture to conditions sufficient to form the polyamide copolymer. The reaction mixture includes adduct A and adduct B. Adduct A is a 1:1 adduct of a diamine having the structure $H_2N-R^1-NH_2$, or a salt thereof, and an aliphatic diacid having the structure $HO-C(O)-R^2-C(O)-OH$, or a salt thereof. Adduct B is a 1:1 adduct of the diamine having the structure $H_2N-R^1-NH_2$, or a salt thereof, and an aromatic diacid having the structure $HO-C(O)-R^3-C(O)-OH$, or a salt thereof. The variable $R^1$ is hexylene and the diamine is hexamethylenediamine. The variable $R^2$ is butylene and the aliphatic diacid is adipic acid. The variable $R^3$ is phenyl and the aromatic diacid is terephthalic acid. The molar ratio of adduct A to adduct B in the reaction mixture is about 65:35 to about 75:25. The polyamide copolymer includes repeating units having the structure:

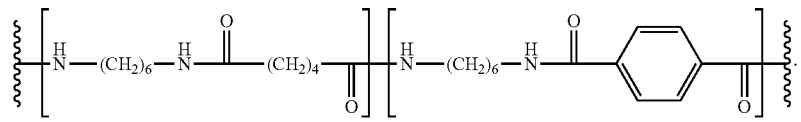

The repeating units are in block or random configuration in the copolymer. The melting point of all of the polyamide copolymer formed during the method is less than or equal to about 300° C.

In various embodiments, the present disclosure provides a polyamide copolymer including repeating units having the structure:

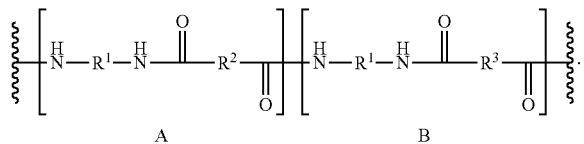

The molar ratio of repeating unit A to repeating unit B is about 61:39 to about 90:10. The melting point of the polyamide copolymer is less than or equal to about 300° C.

In various embodiments, the present disclosure provides a polyamide copolymer including repeating units having the structure:

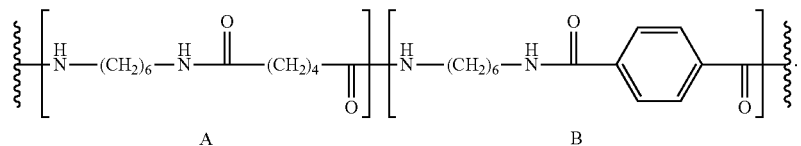

The molar ratio of repeating unit A to repeating unit B is about 65:35 to about 75:25, and the melting point of the polyamide copolymer is less than or equal to about 300° C.

In various embodiments, the polyamide copolymer of the present disclosure and method of making the polyamide copolymer can have certain advantages over other polyamide copolymers and methods of making the same, at least some of which are unexpected. In some embodiments, the copolymer produced by the method of the disclosure contains substantially no materials with a melting point higher than the maximum temperature used during the polymerization reaction, avoiding unmelted material from previous batches contaminating the copolymer product. In some embodiments, the copolymer is produced by the method without the use of base or other additives, avoiding contamination of the product with additives.

In various embodiments, the maximum temperature used during the polymerization reaction is less than or equal to about 300° C., thereby avoiding the thermal degradation of the polymer material and the resulting high melting materials. Avoidance of high melting materials during the polymerization process can be particularly advantageous to yield better quality polymer in the subsequent batches. Therefore, in various embodiments, the polyamide copolymer of the present disclosure can have better mechanical properties than a corresponding polymer made by a different method, such as a method involving higher temperatures.

BRIEF DESCRIPTION OF THE FIGURES

The drawings illustrate generally, by way of example, but not by way of limitation, various embodiments discussed in the present document.

DETAILED DESCRIPTION

Figure 1A:
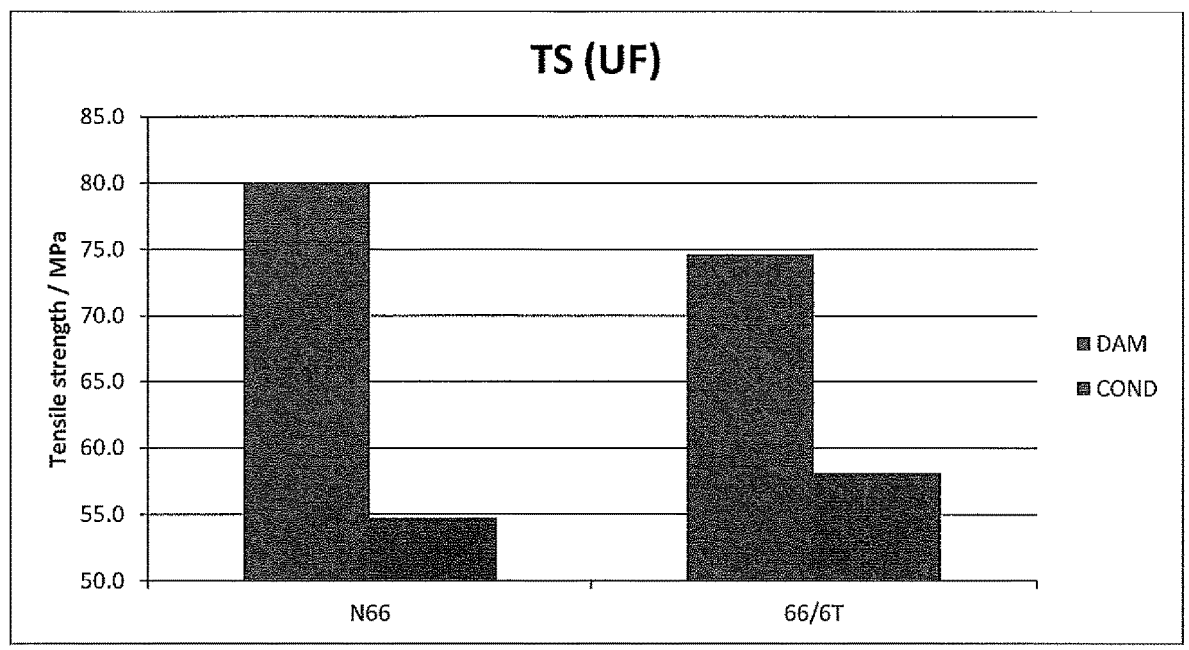
FIGS. 1A-B illustrate the tensile strength of various unfilled and filled polyamides, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

Method of Making a Polyamide Copolymer.

In various embodiments, the present disclosure provides a method of making a polyamide copolymer. The method includes subjecting a reaction mixture to conditions sufficient to form the polyamide copolymer. The reaction mixture can include adduct A and adduct B. Adduct A can be a 1:1 adduct of a diamine having the structure $H_2N$—$R^1$—$NH_2$ or a salt thereof, and an aliphatic diacid having the structure HO—C(O)—$R^2$—C(O)—OH, or a salt thereof. Adduct B is a 1:1 adduct of the diamine having the structure $H_2N$—$R^1$—$NH_2$, or a salt thereof, and an aromatic diacid having the structure HO—C(O)—$R^3$—C(O)—OH, or a salt thereof. At each occurrence, $R^1$ can independently be a substituted or unsubstituted ($C_1$-$C_{20}$)alkylene. At each occurrence, $R^2$ can independently be a substituted or unsubstituted ($C_1$-$C_{20}$)alkylene. At each occurrence, $R^3$ can independently be a substituted or unsubstituted ($C_6$-$C_{20}$)arylene. The molar ratio of adduct A to adduct B in the reaction mixture can be about 61:39 to about 90:10.

The method can be a method for the production of consecutive batches of a polyamide copolymer, such as a hexamethyleneadipamide/hexamethyleneterephthalamide copolymer (e.g., 66/6T) which does not produce high melting species that lead to casting problems. A 60:40 molar ratio of hexamethyleneadipamide:hexamethyleneterephthalamide produces high melting species in batches of polymer produced on a heel from a previous batch unless enough heat can be built into the polymer melt to fully melt out this heel. Due to the relatively high melting point of a 60:40 copolymer of hexamethyleneadipamide:hexamethyleneterephthalamide this can be difficult. By altering the formulation from 60:40 to from about 61:39 to about 90:10, this problem of high melts can be avoided as the maximum melting point of the copolymer is reduced which enables easier melting of the polymer heel from the previous batch.

The reaction mixture can include adduct A and adduct B. The reaction mixture can include any suitable materials in addition to adduct A and adduct B, such as one or more solvents (e.g., water, and water miscible solvents such as alcohols), other reactants (e.g., other species that can participate in the polymerization and that can be incorporated in the copolymer, catalysts, and the like. In some embodiments, the reaction mixture only includes adduct A, adduct B, and aqueous solvent, and is substantially free of other materials. The molar ratio of adduct A to adduct B in the reaction mixture can be any suitable ratio, such as about 61:39 to about 90:10, about 61:39 to about 85:15, about 61:39 to about 80:20, about 65:35 to about 75:25, about 70:30, or about 61:39 or less, or less than, equal to, or greater than about 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, or about 90:10 or more. The concentration of adducts A and B in the reaction mixture can be any suitable concentration. For example, the combined concentration of adducts A and B in the reaction mixture can be about 10 wt % to about 90 wt %, about 40 wt % to about 50 wt %, about 10 wt % or less, or less than, equal to, or greater than about 15 wt %, 20, 22, 24, 26, 28, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 62, 64, 66, 68, 70, 75, 80, 85 wt %, or about 90 wt % or more.

Adduct A can be a 1:1 adduct of a diamine having the structure $H_2N-R^1-NH_2$, or a salt thereof, and an aliphatic diacid having the structure $HO-C(O)-R^2-C(O)-OH$, or a salt thereof. The adduct can be any suitable material that results from an approximately 1:1 molar ratio of the diamine or a salt thereof being in the presence of the aliphatic diacid or a salt thereof. The adduct can be a mixture of the diamine and the diacid, the adduct can be a material that forms as a result of the mixture of the diamine and the diacid, or a combination thereof. A mixture that forms adduct A need not include exactly a 1:1 molar ratio of the diamine or a salt thereof and the aliphatic diacid or a salt thereof; for example, the mixture can include more diamine than diacid or vice versa. The adduct can be a salt. For example, the carboxylic acid groups can protonate the amine groups to form ammonium/carboxylate ion pairs.

At each occurrence, $R^1$ can independently be a substituted or unsubstituted $(C_1-C_{20})$alkylene. The variable $R^1$ can be $(C_1-C_{10})$alkylene. The variable $R^1$ can be 2-methylpentylene and the diamine can be 2-methylpentamethylenediamine (MPMD). The variable $R^1$ can be hexylene and the diamine can be hexamethylenediamine. At each occurrence, $R^2$ can independently be a substituted or unsubstituted $(C_1-C_{20})$alkylene. The variable $R^2$ can be $(C_1-C_{10})$alkylene. The variable $R^2$ can be butylene and the aliphatic diacid can be adipic acid.

Adduct B can be a 1:1 adduct of the diamine having the structure $H_2N-R^1-NH_2$, or a salt thereof, and an aromatic diacid having the structure $HO-C(O)-R^3-C(O)-OH$, or a salt thereof. The adduct can be any suitable material that result from an approximately 1:1 molar ratio of the diamine or a salt thereof being in the presence of the aromatic diacid or a salt thereof. The adduct can be a mixture of the diamine and the diacid, the adduct can be a material that forms as a result of the mixture of the diamine and the diacid, or a combination thereof. A mixture that forms adduct B need not include exactly a 1:1 molar ratio of the diamine or a salt thereof and the aromatic diacid or a salt thereof; for example, the mixture can include more diamine than diacid or vice versa. The adduct can be a salt. For example, the carboxylic acid groups can protonate the amine groups to form ammonium/carboxylate ion pairs.

In some embodiments, acetic acid may be added at about 0.1 mole % to about 10 mole % or about 1.5 mole % to the salt prior to polymerization to limit molecular weight (MW) growth during the polymerization. High MW in the polymer product (inferred from RV measurement) can make casing the polymer problematic due to high melt viscosity.

Adducts A and B can be formed separately or together. Forming adducts A and B separately can include forming a mixture that includes a 1:1 molar ratio of the diamine or a salt thereof and the aliphatic diacid or a salt thereof, forming a mixture that includes a 1:1 molar ratio of the diamine or a salt thereof and the aromatic diacid or a salt thereof, and combining adducts A and B (e.g., combining the two mixtures, or purifying adducts A and B and combining the purified adducts). Forming adducts A and B together can include forming a mixture that includes a 1:1 molar ratio of the diamine or a salt thereof and the aliphatic diacid or a salt thereof and that separately includes a 1:1 molar ratio of the diamine or a salt thereof and the aromatic diacid or a salt thereof, such that the number of moles diamine or salt thereof present is equal to the combined number of moles of the aliphatic diacid or a salt thereof and of the aromatic diacid or a salt thereof. Forming adducts A and B together can include forming the adducts at the same or different reaction rates. The adducts formed together can be used as is or can be purified before being used in the reaction mixture.

At each occurrence, $R^3$ can independently be a substituted or unsubstituted $(C_6-C_{20})$arylene. Variable $R^3$ can be phenyl and the aromatic diacid can be independently selected from terephthalic acid and isophthalic acid. The variable $R^3$ can be phenyl and the aromatic diacid can be terephthalic acid.

The polyamide copolymer can include repeating units having the structure:

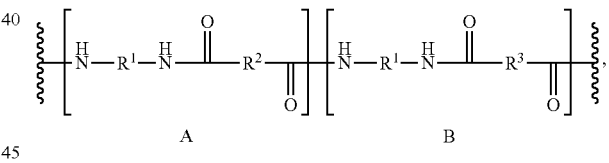

The molar ratio of repeating unit A to repeating unit B can be about the same as the molar ratio of adduct A to adduct B. The polyamide copolymer can have the structure:

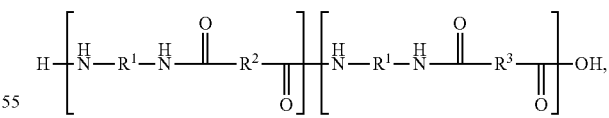

or a salt thereof. The polyamide copolymer can include repeating units having the structure:

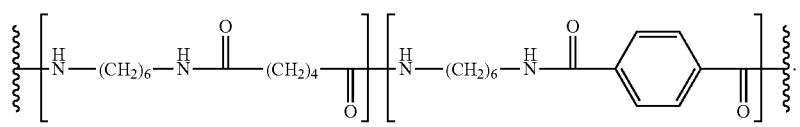

The polyamide copolymer can have the structure:

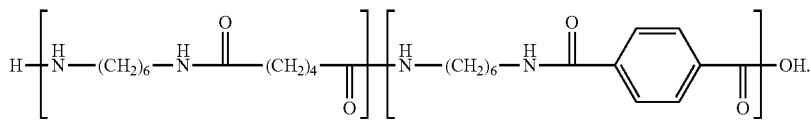

The repeating units can be in block or random configuration in the copolymer.

The polyamide copolymer formed by the method can have any suitable melting point. The polyamide copolymer formed can have various lengths (e.g., various degrees of polymerization), such that the polyamide copolymer exhibits a range of melting points. The polyamide copolymer can have any suitable maximum melting point (e.g., the melting point at which all of the polyamide copolymer formed melts). The polyamide copolymer can have a melting point equal to or less than the maximum temperature used when subjecting the reaction mixture to the conditions sufficient to form the polyamide copolymer. The melting point of the polyamide copolymer can be about 100° C. to about 310° C., about 100° C. to about 300° C., or about 200° C. to about 300° C., or about 100° C. or less. The polyamide copolymer can have a melting point less than or equal to about (e.g., a maximum melting point less than or equal to about) 310° C., 300° C., 295° C., 290° C., 280° C., or about 270° C. or less.

The method includes subjecting the reaction mixture including adducts A and B to conditions sufficient to form the polyamide copolymer. Subjecting the reaction mixture conditions sufficient to form the polyamide copolymer can be performed in a reactor, such as a batch reactor or a continuous reactor. In some embodiments, the reactor is an autoclave (e.g., an autoclave having the ability to remove water from a reaction mixture therein). After forming the polyamide copolymer, the method can further include removing a majority (e.g., greater than 50 wt %) of the polyamide copolymer from the reactor and subsequently performing the method again (e.g., adding another reaction mixture to the reactor including adducts A and B and subjecting the reaction mixture to conditions sufficient to form more of the polyamide copolymer). The removing of the polyamide copolymer from the reactor can leave a minor amount of the polyamide copolymer on the inner surfaces of the reactor. The subsequent performance of the method can be conducted immediately after the removal of the polyamide copolymer from the reactor, and can be performed without cleaning the minor amount of the polyamide copolymer from the inner surfaces of the reactor. The removing can be performed in any suitable way, such as by pouring or otherwise flowing melted polyamide copolymer out of the reactor. In various embodiments, after removing the majority of the polyamide copolymer from the reactor, none of the polyamide copolymer remaining in the reactor has a melting point greater than (e.g., none of the material formed during the reaction has a melting point greater than) about 310° C., 300° C., 295° C., 290° C., 280° C. or about 270° C. or less. In various embodiments, during subsequent performance of the method, substantially no polyamide copolymer remains unmelted, unhydrolyzed, or otherwise unbroken up or undispersed, in the reactor, including both the polymer formed during the current cycle of the method and polymer left behind in the reactor from a prior cycle of the method.

During the subjecting of the reaction mixture to conditions sufficient to form the polyamide copolymer, the maximum temperature of the reactor can be about 310° C., 300° C., 295° C., 295° C., 290° C., 280° C., or about 270° C. or less.

Subjecting of the reaction mixture to conditions sufficient to form the polyamide copolymer can include removing water from the reaction mixture. Water can be removed from the reaction mixture until water is about 0 wt % to about 30 wt % of the reaction mixture, or about 0 wt %, or about 0.0001 wt % or less, or less than, equal to, or greater than about 0.0005, 0.001, 0.005, 0.01, 0.2, 0.4, 0.6, 0.8, 0.1, 0.2, 0.3, 0.4, 0.5, 0.6, 0.7, 0.8, 0.9, 1, 1.5, 2, 2.5, 3, 4, 5, 6, 7, 8, 9, 10, 12, 14, 16, 18, 20, 22, 24, 26, 28 wt, or about 30 wt % or more. Removing water from the reaction mixture can include heating the reaction mixture under pressure while removing water, heating the reaction mixture under vacuum while removing water, or a combination thereof. For example, removing water can include heating under pressure with removal of water first, and then heating under vacuum with removal of water second.

The subjecting of the reaction mixture to conditions sufficient to form the polyamide copolymer can include subjecting the reaction mixture to a maximum pressure of about 2070 kPa (300 psi), or to a pressure of about 0.001 kPa to about 20,000 kPa, 0.1 kPa to about 2100 kPa, about 27.6 kPa (4 psi) to about 1860 kPa (270 psi), or about 0.001 kPa or less, or less than, equal to, or greater than about 0.01 kPa, 0.1, 1, 2, 4, 6, 10, 15, 20, 25, 50, 75, 100, 200, 250, 500, 750, 1,000, 1,250, 1,500, 1,750, 2,000, 2,500, 5,000, 10,000, or about 20,000 kPa or more.

The subjecting of the reaction mixture to conditions sufficient to form the polyamide copolymer can include subjecting the reaction mixture to a temperature of about (e.g., not exceeding) about 100° C. to about 310° C., about 200° C. to about 300° C., or less than or equal to about 310° C., 300° C., 295° C., 290° C., 280° C., or about 270° C. or less.

In various embodiments, a reactor containing the reaction mixture (e.g., an autoclave) can be sealed and the reaction mixture can be heated gradually to about 100° C. to about 250° C. (e.g., about 200° C.) with removal of water to concentrate the reaction mixture to about 60 wt % to about 95 wt % (e.g., 70 wt % to about 85%). The concentrated reaction mixture can be heated until a pressure of 200 kPa to about 2100 kPa (e.g., about 1724 kPa (250 psi) to about 1860 kPa (270 psi)) is achieved. The reaction mixture can be held at this pressure with gradual distillation of water until a reaction mixture temperature of about 200° C. to about 290° C. (e.g., 250° C. to about 270° C.) is achieved. The wt % water in the reaction mixture can be brought to about 15 wt % to about 30 wt % via the gradual distillation of the water. The reaction mixture pressure can be released over a suitable period (e.g., 15-45 mins) until it reaches atmospheric pressure. The reaction mixture pressure can be gradually reduced under vacuum to about 0.001 kpa to about 50 kPa (e.g., about 28 kPa (4 psi) to about 103 kPa (15 psi) and can be held at this pressure while reaction mixture is heated to 270° C. to about 310° C. (e.g., about 290° C. to about 300° C.). The reaction mixture can be held at this temperature and pressure for a suitable period (e.g., 5-30 mins) before the polymer melt is discharged from the autoclave.

Polyamide Copolymer and Composition Including the Same.

In various embodiments, the present disclosure provides a polyamide copolymer, or a composition including the same. The polyamide copolymer can be any polyamide copolymer that can be made by an embodiment of the method described herein.

The polyamide copolymer can include repeating units having the structure:

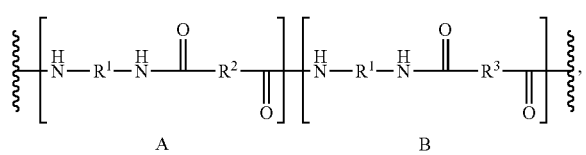

The molar ratio of repeating unit A to repeating unit B can be about 61:39 to about 90:10, about 61:39 to about 85:15, about 61:39 to about 80:20, about 65:35 to about 75:25, about 70:30, or about 61:39 or less, or less than, equal to, or greater than about 62:38, 63:37, 64:36, 65:35, 66:34, 67:33, 68:32, 69:31, 70:30, 71:29, 72:28, 73:27, 74:26, 75:25, 76:24, 77:23, 78:22, 79:21, 80:20, 81:19, 82:18, 83:17, 84:16, 85:15, 86:14, 87:13, 88:12, 89:11, or about 90:10 or more. At each occurrence, $R^1$ can independently be a substituted or unsubstituted $(C_1-C_{20})$alkylene. The variable $R^1$ can be $(C_1-C_{10})$alkylene. The variable $R^1$ can be hexylene. At each occurrence, $R^2$ can independently be a substituted or unsubstituted $(C_1-C_{20})$alkylene. The variable $R^2$ can be $(C_1-C_{10})$alkylene. The variable $R^2$ can be butylene. At each occurrence, $R^3$ can independently be a substituted or unsubstituted $(C_6-C_{20})$arylene. Variable $R^3$ can be phenyl that is para- or meta-substituted in the backbone of the copolymer.

The polyamide copolymer can have the structure:

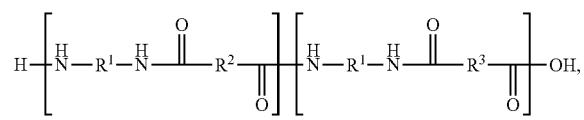

or a salt thereof. The polyamide copolymer can include repeating units having the structure:

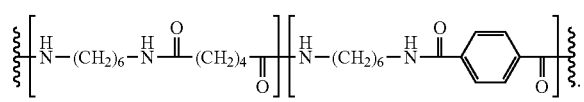

The polyamide copolymer can have the structure:

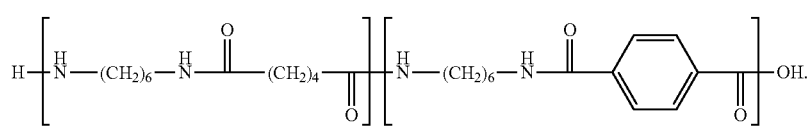

The repeating units can be in block or random configuration in the copolymer.

The polyamide copolymer can have any suitable melting point. The polyamide copolymer can have various lengths (e.g., various degrees of polymerization), such that the polyamide copolymer exhibits a range of melting points. The polyamide copolymer can have any suitable maximum melting point (e.g., the melting point at which all of the polyamide copolymer formed melts). The melting point of the polyamide copolymer can be about 100° C. to about 310° C., about 100° C. to about 300° C., or about 200° C. to about 300° C., or about 100° C. or less, or less than or equal to about 310° C., 300° C., 295° C., 290° C., 280° C., or about 270° C. or less. The polyamide copolymer can have a melting point less than or equal to about (e.g., a maximum melting point less than or equal to about) about 310° C., 300° C., 295° C., 290° C., 280° C., or about 270° C. or less. The polyamide copolymer, or a composition including the polyamide copolymer, can be free of materials having a melting point greater than about 310° C., 300° C., 299, 298, 297, 296, 295, 294, 293, 292, 291, 290, 280, or about 270° C. or less.

The composition can include any material in addition to the polyamide copolymer. The composition can include one polyamide copolymer or more than one polyamide copolymer. The composition can include a polyester such as poly(ethylene terephthalate) or polycaprolactone; a polycarbonate; a polyether; an epoxy polymer; an epoxy vinyl ester polymer, a polyimide such as polypyromellitimide; a phenol-formaldehyde polymer; an amineformaldehyde polymer such as a melamine polymer, a polysulfone; a poly(acrylonitrile-butadiene-styrene)(ABS); a polyurethane; a polyolefin such as polyethylene, polystyrene, polyacrylonitrile, a polyvinyl, polyvinyl chloride, or poly(dicyclopentadiene); a polyacrylate such as poly(ethyl acrylate); a poly(alkylacrylate) such as poly(methyl methacrylate); a polysilane such as poly(carborane-silane); a cyanate resin system; a polyphosphazene; and combinations thereof. The composition can include an elastomer, such as an elastomeric polymer, an elastomeric copolymer, an elastomeric block copolymer, an elastomeric polymer blend, or combinations thereof. Examples of elastomer polymers can include polyolefins, polysiloxanes such as poly(dimethylsiloxane)(PDMS), polychloroprene, and polysulfides; examples of copolymer elastomers may include polyolefin copolymers and fluorocarbon elastomers; examples of block copolymer elastomers may include acrylonitrile block copolymers, polystyrene block copolymers, polyolefin block copolymers, polyester block copolymers, polyamide block copolymers, and polyurethane block copolymers, and examples of polymer blend elastomers include mixtures of an elastomer with another polymer. The composition can include a mixture of these polymers, including copolymers that include repeating units of two or more of these polymers, and/or including blends of two or more of these polymers. The composition can include one or more catalysts, acid generators, solvents, crosslinkers, fillers (e.g., glass fibers, such as about 10 wt % to about 50 wt % glass fibers, such as 30 wt %), stabilizers, antioxidants, flame retardants, plasticizers, colorants, dyes, fragrances, adhesion promoters, or combinations thereof.

EXAMPLES

Various embodiments of the present disclosure can be better understood by reference to the following Examples which are offered by way of illustration. The present disclosure is not limited to the Examples given herein.

Example (A). 60:40 Molar Ratio of Hexamethyleneadipamide:Hexamethyleneterephthalamide. Comparative Example at Temperature Below 300° C.

Aqueous salt solutions of hexamethyleneadipamide (i.e., 1:1 molar adduct of $H_2N-(CH_2)-NH_2$ and $HO-C(O)-(CH_2)_6-C(O)-OH$) and hexamethyleneterephthalamide (i.e., 1:1 molar adduct of $H_2N-(CH_2)_6-NH_2$ and $HO-C(O)$-(phen-1,4-ylene)-$C(O)-OH$) were struck together in a molar ratio of 60% hexamethyleneadipamide to 40% hexamethyleneterephthalamide at 40% concentration and these are charged to an autoclave system capable of reaching temperature of up to 310° C. and pressure of 300 psi and with the capability of gradual distillation of water.

The autoclave was sealed and the salt solution was heated gradually to 200° C. to concentrate the salt solution to 80%. The concentrated salt solution was heated until a pressure of 270 psi was achieved. The reaction was held at 270 psi by gradual distillation of water until a contents temperature of 270° C. is achieved. The reaction pressure was released over a period of 30 minutes until it reached atmospheric pressure. The reaction pressure was gradually reduced under vacuum to 4 psi and held at this pressure while the temperature built to 290° C. over a period of 30 minutes before the polymer melt was discharged from the autoclave.

One batch of polymer was produced via this method. However, when a second batch was produced the material that was discharged from the autoclave the resulting lace was very lumpy and the yield of polymer that could be obtained was poor due to plugging of the discharge valve caused by the high melts. Subsequent batch production after the first batch did not successfully produce good quality materials and experienced significant casting issues.

Example 1(B). 60:40 Molar Ratio of Hexamethyleneadipamide:Hexamethyleneterephthalamide. Comparative Example at Temperature Above 300° C.

Aqueous salt solutions of hexamethyleneadipamide and hexamethyleneterephthalamide were struck together in a molar ratio of 60% hexamethyleneadipamide to 40% hexamethyleneterephthalamide at 40% concentration and these were charged to an autoclave system capable of reaching temperature of up to 310° C. and pressure of 300 psi and with the capability of gradual distillation of water.

The autoclave was sealed and the salt solution was heated gradually to 200° C. to concentrate the salt solution to 80%. The concentrated salt solution was heated until a pressure of 265 psi was achieved. The reaction was held at 265 psi by gradual distillation of water until a contents temperature of 289° C. was achieved. The reaction pressure was released over a period of 30 minutes until it reached atmospheric pressure. The reaction pressure was gradually reduced under vacuum to 5 psi and held at this pressure while the temperature built to 315° C. over a period of 30 minutes before the polymer melt was discharged from the autoclave.

One batch of polymer was produced via this method. However, the material produced was discoloured, aerated, and contained lumps making for an unsuccessful casting process and a poor quality/unusable material. Despite this, a second batch was produced by the same method but the polymer produced was also discoloured, aerated and contained more lumps than the first batch again making for an unsuccessful casting process and a poor quality/unusable material. Subsequent batch production after the first batch did not successfully produce good quality materials, and experienced significant casting issues.

Example 1(C). 60:40 Molar Ratio of Hexamethyleneadipamide:Hexamethyleneterephthalamide. Comparative Example Including Sodium Hydroxide Addition Aqueous salt solutions of hexamethyleneadipamide and hexamethyleneterephthalamide were struck together in a molar ratio of 60% hexamethyleneadipamide to 40% hexamethyleneterephthalamide at 40% concentration and these were charged to an autoclave system capable of reaching temperature of up to 310° C. and pressure of 300 psi and with the capability of gradual distillation of water. Prior to addition to the autoclave, sodium hydroxide (0.63 mol %) was added to the salt.

The autoclave was sealed and the salt solution was heated gradually to 200° C. to concentrate the salt solution to 80%. The concentrated salt solution was heated until a pressure of 265 psi was achieved. The reaction was held at 265 psi by gradual distillation of water until a contents temperature of 269° C. was achieved. The reaction pressure was released over a period of 30 minutes until it reached atmospheric pressure. The reaction pressure was gradually reduced under vacuum to 5 psi and held at this pressure while the temperature built to 289° C. over a period of 30 minutes before the polymer melt was discharged from the autoclave.

The polymer produced using this method was very low viscosity implying a low molecular weight material and aerated making for an unsuccessful casting process. A second batch was produced by the same method and the casting behaviour and polymer produced were the same as the first batch. Subsequent batch production after the first batch therefore did not successfully produce good quality material.

Example 2. 70:30 Molar Ratio of Hexamethyleneadipamide:Hexamethyleneterephthalamide Aqueous salt solutions of hexamethyleneadipamide (i.e., 1:1 molar adduct of $H_2N-(CH_2)_6-NH_2$ and $HO-C(O)-(CH_2)_6-C(O)-OH$) and hexamethyleneterephthalamide (i.e., 1:1 molar adduct of $H_2N-(CH_2)_6-NH_2$ and $HO-C(O)$-(phen-1,4-ylene)-$C(O)-OH$) were struck together in a molar ratio of 70% hexamethyleneadipate to 30% hexamethyleneterephthalate at 40% concentration and these were charged to an autoclave system capable of reaching temperature of up to 310° C. and pressure of 300 psi and with the capability of gradual distillation of water.

The autoclave was sealed and the salt solution was heated gradually to 200° C. to concentrate the salt solution to 80%. The concentrated salt solution was heated until a pressure of 270 psi was achieved. The reaction was held at 270 psi by gradual distillation of water until a contents temperature of 270° C. was achieved. The reaction pressure was released over a period of 30 mins until it reached atmospheric pressure. The reaction pressure was gradually reduced under vacuum to 4 psi and held at this pressure while the temperature built to 290° C. over a period of 30 minutes before the polymer melt was discharged from the autoclave.

Five successive batches of polymer were produced using this method using the same autoclave without cleaning with no evidence of high melts which allowed for good casting of the polymer and good yields. The recovered product quality was consistent from batch to batch produced using the procedure of this example.

Example 3. Characterization of Product

The following materials were characterized: N66 (nylon 66), 70:30 66/6T (a blend of first and subsequent batches of the material formed in Example 2), 60:40 66/6T (the first batch of material formed in Example 1(A)), N66 GF (a blend of nylon 66 and 33 wt % glass fibers), 70:30 66/6T (33% GF)(a blend of first and subsequent batches of the material formed in Example 2 and 33 wt % glass fibers), 60:40 66/6T (33% GF) (a blend of the first batch of material formed in Example 1(A) and 33 wt % glass fibers), and Amodel® AS-4133 HS (polyphthalamide with 33% glass fiber). The glass fibers were standard short glass fibers. The measured properties of the materials are shown in Table 1. "DAM" indicates a dry material having equivalent moisture content as when it was molded. "COND" indicates a conditioned material that has absorbed moisture to an equilibrium level at 70° C. and 62% relative humidity. RV is relative viscosity as measured (unless otherwise indicated) in a 1 wt % solution in concentrated sulphuric acid for the 70:30 66/6T and 60:40 66/6T. $T_g$ is glass transition temperature. HDT is heat deflection temperature. In Table 1, "C" means a complete break, and "H" means a hinged break.

TABLE 1

| RV | Test method | N66 50 (formic acid) | | 70:30 66/6T 2.2 (sulphuric acid-average across combined batches) | | 60:40 66/6T 2.2 | N66 (33% GF) | | 70:30 66/6T (33% GF) | | 60:40 66/6T (33% GF) | Amodel® | |
|---|---|---|---|---|---|---|---|---|---|---|---|---|---|
| | | DAM | COND | DAM | COND | DAM | DAM | COND | DAM | COND | DAM | DAM | COND |
| Tensile Strength (MPa) | ISO 527 | 80.0 | 54.7 | 74.6 | 58.1 | 80.5 | 212.0 | 137.0 | 183.0 | 132.0 | 171 | 160.0 | 125.0 |
| Tensile Modulus (GPa) | ISO 527 | 3.0 | 1.2 | 3.0 | 1.8 | 2.94 | 9.9 | 7.6 | 10.0 | 8.0 | 9.69 | 11.5 | 11.2 |
| Elongation @ Yield (%) | ISO 527 | 4.5 | | 4.3 | | 5.3 | 5.6 | 6.8 | 4.4 | 6.3 | 5.09 | 3.6 | 3.0 |
| Elongation @ Break (%) | ISO 527 | 4.5 | 87.0 | 4.3 | 12.0 | 5.3 | 5.6 | 6.8 | 4.4 | 6.3 | 5.09 | 3.6 | 3.0 |
| Flexural Strength (MPa) | ISO 178 | 115.0 | 41.0 | 95.5 | 60.0 | 98.3 | 273.0 | 197.0 | 256.0 | 206.0 | 243 | 267.0 | 201.0 |
| Flexural Modulus (GPa) | ISO 178 | 2.7 | 0.9 | 2.2 | 1.5 | 2.08 | 8.4 | 5.9 | 8.6 | 6.8 | 7.3 | 10.2 | 9.1 |
| Notched Charpy Impact Strength (kJ/m2) | ISO 179 | 5.17 (C) | 18.05 (C) | 4.59 (C) | 10.18 (C) | — | 10.6 (C) | 13.83 (C) | 8.92 (C) | 10.09 (C) | — | 8.24 (C) | 6.47 (C) |
| Notched Izod Impact Strength (kJ/m2) | ISO 180 | 4.79 (C) | 13.11 (C) | 4.48 (C) | 9.54 (C) | 4.18 (C) | 11.04 (H) | 13.65 (H) | 9.96 (C) | 9.51 (some C and H) | 10.6 (C) | 8.18 (C) | 6.12 (C) |
| Melting point (° C.) | DSC (20° C./min) | 262.0 | | 284.0 | | 291.0 | 262.0 | | 284.0 | | 291.0 | 327.0 | |
| Tg (° C.) | DMA | 79.0 | | 85.0 | | 93.0 | 79.0 | | 85.0 | | 93.0 | 97.0 | |
| HDT @ 0.45 MPa (° C.) | ISO 75 | 182.0 | | 202.0 | | 181.0 | 262.0 | | 266.0 | | 276 | 320.0 | |
| HDT @ 1.80 MPa (° C.) | ISO 75 | 67.0 | | 77.0 | | 79.0 | 249.0 | | 248.0 | | 256 | 294.0 | |
| Vicat-A50 (° C.) | ISO 306 | 258.7 | | 261.1 | | | | | 264.0 | | | | |
| Vicat-A120 (° C.) | ISO 306 | 256.3 | | 258.3 | | | | | 261.0 | | | | |
| Vicat-B50 (° C.) | ISO 306 | 240.4 | | 239.4 | | | | | 254.0 | | | | |
| Vicat-B120 (° C.) | ISO 306 | 239.8 | | 235.6 | | | | | | | | | |
| Water uptake (24 hrs, full immersion at 23 C.) (%) | ISO 62 | 1.2 | | 0.7 | | 1.0 | | | | | | | |
| Moisture uptake at equilibrium- 70° C., 62% RH (%) | ISO 1110 | | 3.0 | | 2.5 | | | | 1.9 | | 1.8 | | |

Figure 1B:
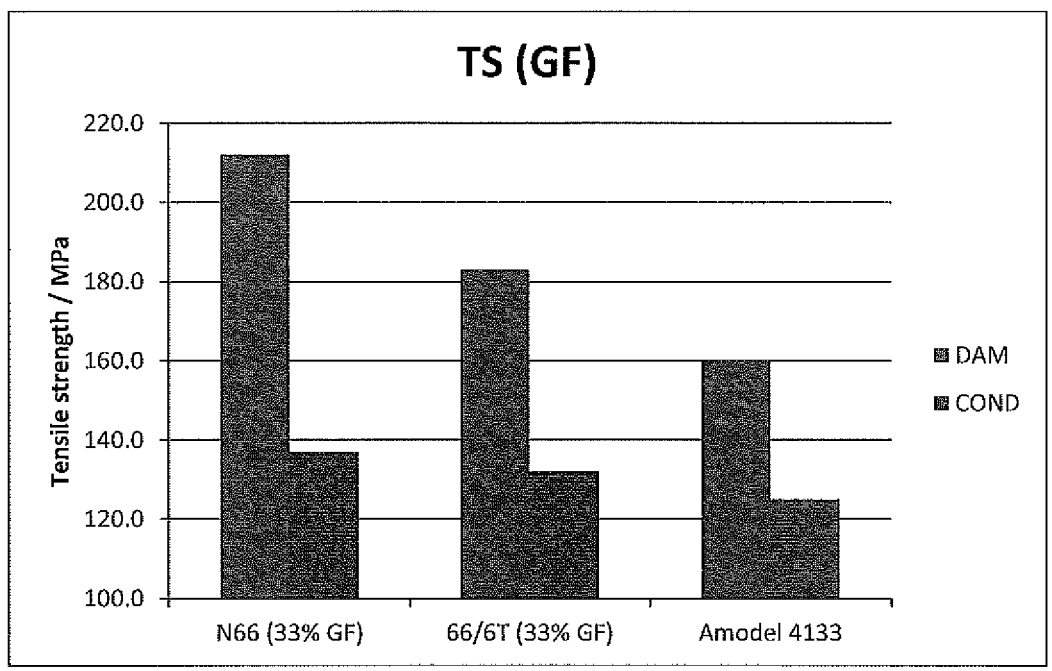

FIG. 1a illustrates the tensile strength of N66 and of the 66/6T of Example 2. FIG. 1b illustrates the tensile strength of glass fiber-filled N66, glass fiber filled 66/6T of Example 2, and of Amodel® 4133.

Figure 2A:
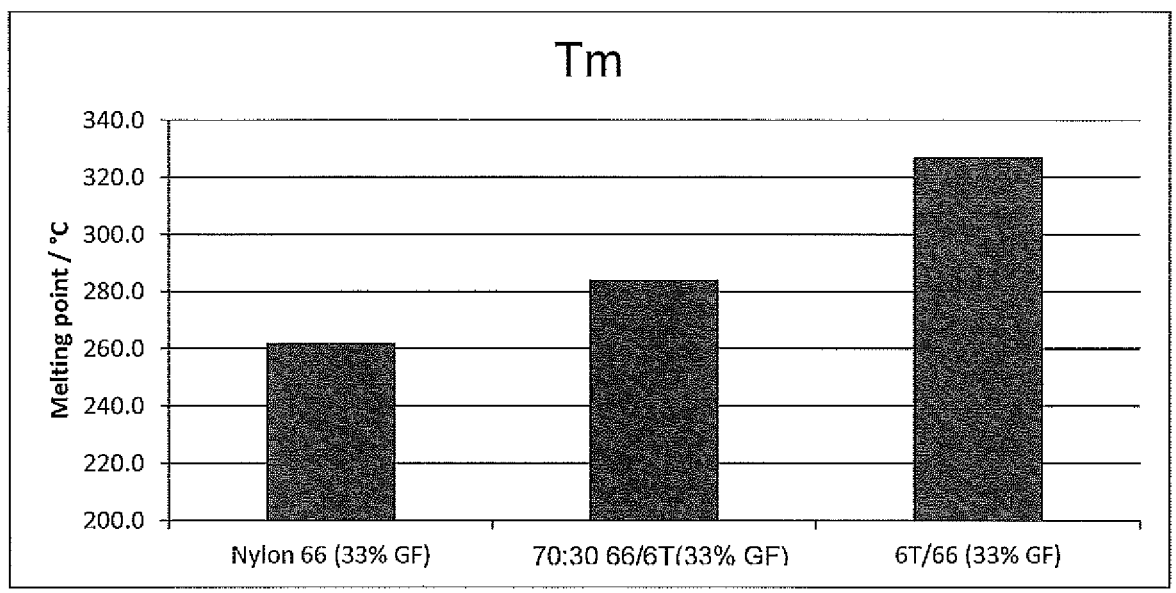
FIGS. 2A-B illustrate the melting point of various unfilled and glass fiber-filled polyamides, in accordance with various embodiments.
Figure 2B:
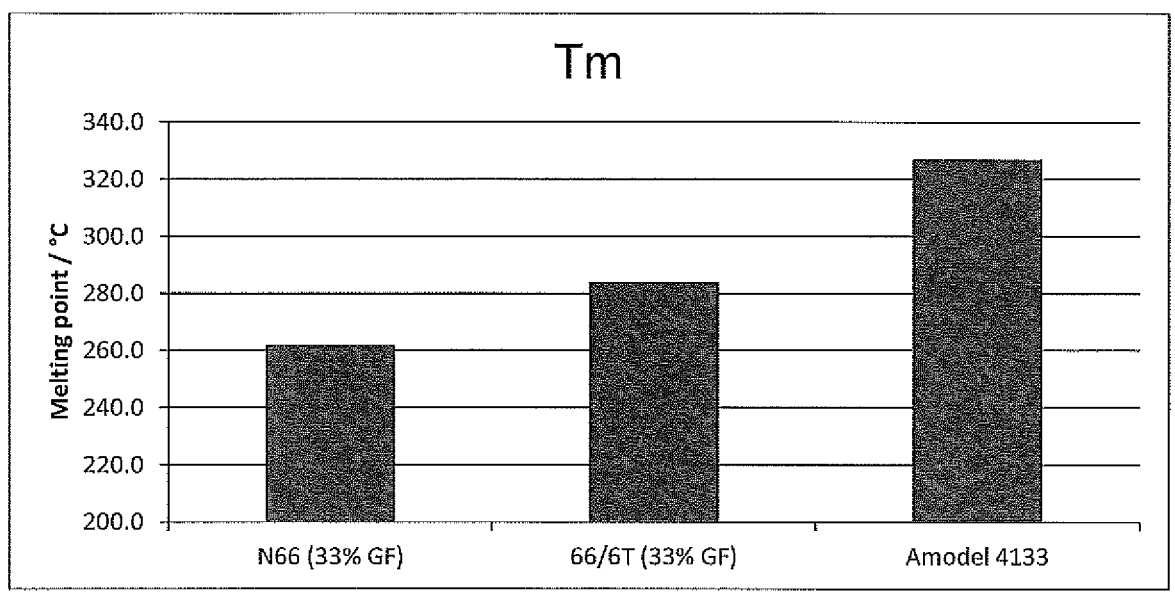

FIG. 2a illustrates the melting point of N66, 70:30 66/6T (33% GF) (a blend of first and subsequent batches of the material formed in Example 2 and 33 wt % glass fibers), and of the 66/6T of Example 2. FIG. 2b illustrates the melting point of glass fiber-filled N66, glass fiber filled 66/6T of Example 2, and of Amodel® 4133.

Figure 3:
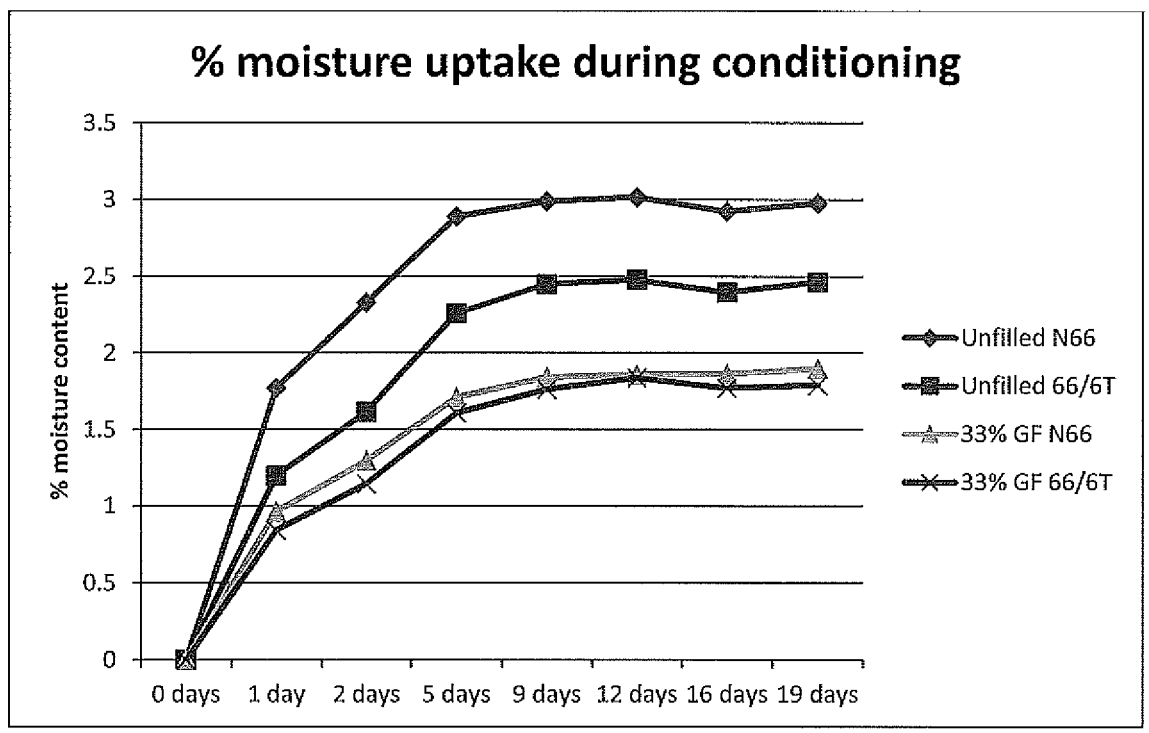
FIG. 3 illustrates the percent moisture uptake during conditioning of various unfilled and glass fiber-filled polyamides, in accordance with various embodiments.

FIG. 3 illustrates the percent moisture uptake during conditioning of N66, the 66/NT of Example 2, and of the 33 glass fiber blends of each.

Table 2 illustrates heat aging data for N66 (nylon 66), 220° C. 1000 h aged N66, 230° C. 784 h aged N66, 70:30 66/6T (a blend of first and subsequent batches of the material formed in Example 2), 220° C. 1000 h 70:30 66/6T (a blend of first and subsequent batches of the material formed in Example 2 aged for 1000 h at 220° C.), 230° C. 784 h 70:30 66/6T (a blend of first and subsequent batches of the material formed in Example 2 aged for 784 h at 230° C.).

TABLE 2

| Property | N66 | 220° C. Aged N66 (1000 hrs) | 230° C. Aged N66 (784 hrs) | 70:30 66/6T | 220° C. Aged 66/6T (1000 hrs) | 230° C. Aged 66/6T (784 hrs) |
|---|---|---|---|---|---|---|
| Tensile strength (MPa) (% retention) | 212 | N/A (0%) | N/A (0%) | 183 | 64.2 (35%) | 13 (7%) |
| Notched Izod (% retention) | 10.6 | N/A (0%) | N/A (0%) | 10 | 5.4 (54%) | 2.3 (23%) |
| % weight loss (300° C., air, 4 hrs) | 4.25 | — | — | 2.85 | — | — |

Example 4. Spinning of Fibers Using 70:30 and 80:20 Molar Ratio of Hexamethyleneadipamide: Hexamethyleneterephthalamide The polymer product of Example 2, and a polymer product formed by a similar procedure to that of Example 2 but using an 80:20 molar ratio of hexamethyleneadipamide: hexamethyleneterephthalamide (the polymer product from which showed similar lack of high melts which allowed for good casting of the polymer and good yields), were spun into fibers using the spinning conditions indicated in Table 3. Various mechanical properties of the produced fibers were measured and are shown in Table 4, with "POY" indicating "partially oriented yarn" and with "FDY" indicating fully drawn yarn. The term "DH" is the number of double strokes per unit time.

TABLE 3

| Spinning conditions. | | |
|---|---|---|
| | 70:30 ratio copolymer | 80:20 ratio copolymer |
| Temperature (° C.) | | |
| Zone 1 | 271 | 284 |
| Zone 2 | 275 | 285 |
| Zone 3 | 275 | 285 |
| Spinning head | 274 | 275 |
| Polymer melt | 279 | 284 |
| Screw | | |
| Rotational speed (rpm) | 80-120 | 55 |
| Pressure (bar) | 0-4 | 9 |
| Pump | | |
| Rotational speed (rpm) | 22 | 22 |
| Output (cm³) | 1.2 | 1.2 |
| Spinneret | | |
| No. of holes | 24 | 24 |
| Diameter (μm) | 300 | 300 |
| Pressure (bar) | 24 | 27 |
| Winder | | |
| Winding speed (m/min) | 4200 | 4200 |
| Godet (m/min) | 4170/4180 | 4170/4180 |
| Traverse DH | 498 | 498 |

TABLE 4

| Mechanical properties of fibres | | | | |
|---|---|---|---|---|
| Fiber properties | 70:30 POY | 70:30 FDY | 80:20 POY | 80:20 FDY |
| Titre (dtex) | 68 | 48 | 69 | 50 |
| Elongation (%) | 63 | 18 | 64 | 23 |
| Strength (cN/tex) | 24 | 35 | 31 | 45 |
| Modulus, 0-1% (cN/tex) | 363 | 485 | 373 | 526 |

Example 5. Commercial Batch Production Using 70:30 Molar Ratio of Hexamethyleneadipamide: Hexamethyleneterephthalamide Condensation polymerization of an aqueous salt solution of hexamethyleneadipamide and hexamethyleneterephthalamide in a molar ratio of 70% hexamethyleneadipamide to 30% hexamethyleneterephthalamide was performed in a commercial-scale batch polymerization equipment and using the procedure and conditions described in Example 2. The commercial batch polymerization equipment was capable of reaching temperature of up to 310° C. and pressure of 300 psi and with the capability of gradual distillation of water overhead.

Upon polymerization completion, the polymer melt was recovered from the batch equipment. Operation was continued by charging successive batches in the same equipment and multiple polymer batches were produced by repeating the same procedure and conditions as described in Example 2. All batches were observed to consistently produce good quality polymer product and with high recovery yield. None of the batches faced significant casting issues for polymer recovery. Neither formation of high melt materials nor their accumulation and lumping were observed, making it a commercially viable batch-to-batch production for producing large product quantities.

Additional Embodiments

The following exemplary embodiments are provided, the numbering of which is not to be construed as designating levels of importance:

Embodiment 1 provides a method of making a polyamide copolymer, the method comprising:

subjecting a reaction mixture to conditions sufficient to form the polyamide copolymer, the reaction mixture comprising adduct A and adduct B, wherein adduct A is a 1:1 adduct of a diamine having the structure $H_2N-R^1-NH_2$, or a salt thereof, and an aliphatic diacid having the structure $HO-C(O)-R^2-C(O)-OH$, or a salt thereof, adduct B is a 1:1 adduct of the diamine having the structure $H_2N-R^1-NH_2$, or a salt thereof, and an aromatic diacid having the structure $HO-C(O)-R^3-C(O)-OH$, or a salt thereof, at each occurrence, $R^1$ is independently a substituted or unsubstituted $(C_1-C_{20})$alkylene, at each occurrence, $R^2$ is independently a substituted or unsubstituted $(C_1-C_{20})$alkylene, at each occurrence, $R^3$ is independently a substituted or unsubstituted $(C_6-C_{20})$arylene, the molar ratio of adduct A to adduct B in the reaction mixture is about 61:39 to about 90:10, and the polyamide copolymer comprises repeating units having the structure:

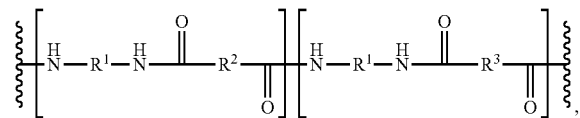

and the repeating units are in block or random configuration in the copolymer.

Embodiment 2 provides the method of Embodiment 1, wherein the molar ratio of adduct A to adduct B in the reaction mixture is about 61:39 to about 85:15.

Embodiment 3 provides the method of any one of Embodiments 1-2, wherein the molar ratio of adduct A to adduct B in the reaction mixture is about 69:31 to about 71:29.

Embodiment 4 provides the method of any one of Embodiments 1-3, wherein the molar ratio of adduct A to adduct B in the reaction mixture is about 70:30.

Embodiment 5 provides the method of any one of Embodiments 1-4, wherein the polyamide copolymer comprises repeating units having the structure:

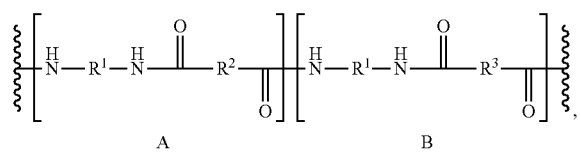

wherein the molar ratio of repeating unit A to repeating unit B is about the same as the molar ratio of adduct A to adduct B.

Embodiment 6 provides the method of any one of Embodiments 1-5, wherein the melting point of all of the polyamide copolymer formed during the method is less than or equal to about 300° C.

Embodiment 7 provides the method of any one of Embodiments 1-6, wherein the melting point of all of the polyamide copolymer formed during the method is less than or equal to about 295° C.

Embodiment 8 provides the method of any one of Embodiments 1-7, wherein the subjecting of the reaction mixture to conditions sufficient to form the polyamide copolymer forms no materials having a melting point greater than 300° C.

Embodiment 9 provides the method of any one of Embodiments 1-8, wherein the melting point of the polyamide copolymer is about 200° C. to about 300° C.

Embodiment 10 provides the method of any one of Embodiments 1-9, wherein $R^1$ is $(C_1-C_{10})$alkylene.

Embodiment 11 provides the method of any one of Embodiments 1-10, wherein $R^1$ is hexylene and the diamine is hexamethylenediamine.

Embodiment 12 provides the method of any one of Embodiments 1-11, wherein $R^2$ is $(C_1-C_{10})$alkylene.

Embodiment 13 provides the method of any one of Embodiments 1-12, wherein $R^2$ is butylene and the aliphatic diacid is adipic acid.

Embodiment 14 provides the method of any one of Embodiments 1-13, wherein $R^3$ is phenyl and the aromatic diacid is independently selected from terephthalic acid and isophthalic acid.

Embodiment 15 provides the method of any one of Embodiments 1-14, wherein $R^3$ is phenyl and the aromatic diacid is terephthalic acid.

Embodiment 16 provides the method of any one of Embodiments 1-15, wherein the polyamide copolymer comprises repeating units having the structure:

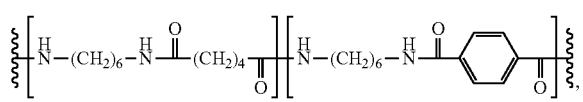

wherein repeating units are in block or random configuration in the copolymer.

Embodiment 17 provides the method of any one of Embodiments 1-16, wherein the polyamide copolymer having the structure:

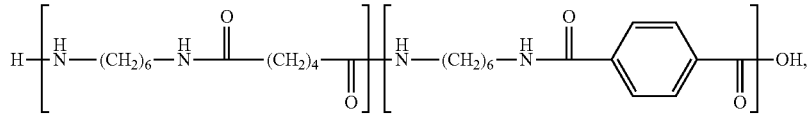

or a salt thereof, wherein repeating units are in block or random configuration in the copolymer.

Embodiment 18 provides the method of any one of Embodiments 1-17, wherein adduct A and adduct B are formed separately before being combined in the reaction mixture.

Embodiment 19 provides the method of any one of Embodiments 1-18, wherein adduct A and adduct B are formed substantially simultaneously in the reaction mixture.

Embodiment 20 provides the method of any one of Embodiments 1-19, wherein adduct A and adduct B together have a concentration of about 10 wt % to about 90 wt % in the reaction mixture.

Embodiment 21 provides the method of any one of Embodiments 1-20, wherein adduct A and adduct B together have a concentration of about 40 wt % to about 50 wt %.

Embodiment 22 provides the method of any one of Embodiments 1-21, wherein the reaction mixture comprises water.

Embodiment 23 provides the method of any one of Embodiments 1-22, wherein the subjecting of the reaction mixture to conditions sufficient to form the polyamide copolymer is performed in a reactor, further comprising removing a majority of the polyamide copolymer from the reactor and subsequently performing the method again.

Embodiment 24 provides the method of Embodiment 23, wherein after removing the majority of the polyamide copolymer from the reactor, none of the polyamide copolymer remaining in the reactor has a melting point greater than about 300° C.

Embodiment 25 provides the method of any one of Embodiments 23-24, wherein during the subsequent performance of the method, no polyamide copolymer remains unmelted, unhydrolyzed, undispersed, or a combination thereof, in the reactor.

Embodiment 26 provides the method of any one of Embodiments 23-25, wherein during the method the maximum temperature of the reactor is equal to or less than about 300° C.

Embodiment 27 provides the method of any one of Embodiments 23-26, wherein during the method the maximum temperature of the reactor is equal to or less than about 290° C.

Embodiment 28 provides the method of any one of Embodiments 23-27, wherein the reactor is a batch reactor.

Embodiment 29 provides the method of any one of Embodiments 23-28, wherein the reactor is an autoclave.

Embodiment 30 provides the method of any one of Embodiments 1-29, wherein the subjecting of the reaction mixture to conditions sufficient to form the polyamide copolymer comprises removing water from the reaction mixture.

Embodiment 31 provides the method of Embodiment 30, wherein the subjecting of the reaction mixture to conditions sufficient to form the polyamide copolymer comprises removing water from the reaction mixture until water is about 0 wt % to about 30 wt % of the reaction mixture.

Embodiment 32 provides the method of Embodiment 31, wherein removing water from the reaction mixture comprises heating the reaction mixture under pressure while removing water, and heating the reaction mixture under vacuum while removing water.

Embodiment 33 provides the method of any one of Embodiments 1-32, wherein the subjecting of the reaction mixture to conditions sufficient to form the polyamide copolymer comprises subjecting the reaction mixture to a maximum pressure of about 2070 kPa (300 psi).

Embodiment 34 provides the method of any one of Embodiments 1-33, wherein the subjecting of the reaction mixture to conditions sufficient to form the polyamide copolymer comprises subjecting the reaction mixture to a pressure of about 28 kPa (4 psi) to about 1860 kPa (270 psi).

Embodiment 35 provides the method of any one of Embodiments 1-34, wherein the subjecting of the reaction mixture to conditions sufficient to form the polyamide copolymer comprises subjecting the reaction mixture to a temperature of about 200° C. to about 300° C.

Embodiment 36 provides the method of any one of Embodiments 1-35, wherein the subjecting of the reaction mixture to the conditions sufficient to form the polyamide copolymer is performed in a reaction vessel closed to the atmosphere, the method further comprising:

removing the polyamide copolymer from the reaction vessel comprising leaving a minor amount thereof on inner surfaces of the reaction vessel; and repeating the subjecting of the reaction mixture to the conditions sufficient to form the polyamide copolymer in the reaction vessel without cleaning the minor amount of the polyamide copolymer from the inner surfaces of the reaction vessel between successive batches.

Embodiment 37 provides a polyamide copolymer made by the method of any one of Embodiments 1-36.

Embodiment 38 provides a method of making a polyamide copolymer, the method comprising:

subjecting a reaction mixture to conditions sufficient to form the polyamide copolymer, the reaction mixture comprising adduct A and adduct B, wherein adduct A is a 1:1 adduct of a diamine having the structure $H_2N-R^1-NH_2$, or a salt thereof, and an aliphatic diacid having the structure $HO-C(O)-R^2-C(O)-OH$, or a salt thereof, adduct B is a 1:1 adduct of the diamine having the structure $H_2N-R^1-NH_2$, or a salt thereof, and an aromatic diacid having the structure $HO-C(O)-R^1-C(O)-OH$, or a salt thereof, $R^1$ is hexylene and the diamine is hexamethylenediamine, $R^2$ is butylene and the aliphatic diacid is adipic acid, $R^3$ is phenyl and the aromatic diacid is terephthalic acid, the molar ratio of adduct A to adduct B in the reaction mixture is about 65:35 to about 75:25, and the polyamide copolymer comprises repeating units having the structure:

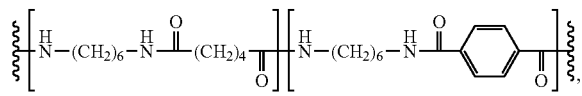

the repeating units are in block or random configuration in the copolymer, and the melting point of all of the polyamide copolymer formed during the method is less than or equal to about 300° C.

Embodiment 39 provides a polyamide copolymer comprising repeating units having the structure:

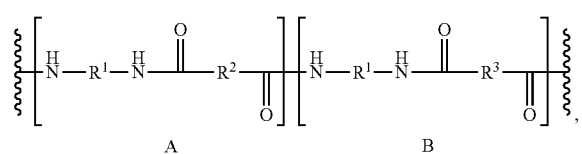

wherein
the molar ratio of repeating unit A to repeating unit B is about 61:39 to about 90:10, and
the melting point of the polyamide copolymer is less than or equal to about 300° C.

Embodiment 40 provides a composition comprising the polyamide copolymer of Embodiment 39.

Embodiment 41 provides the composition of Embodiment 40, wherein the composition is free of materials having a melting point of greater than 300° C.

Embodiment 42 provides a polyamide copolymer comprising repeating units having the structure:

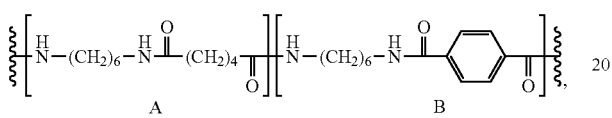

wherein
the molar ratio of repeating unit A to repeating unit B is about 65:35 to about 75:25, and
the melting point of the polyamide copolymer is less than or equal to about 300° C.

Embodiment 43 provides the method, composition, or polyamide copolymer of any one or any combination of Embodiments 1-42 optionally configured such that all elements or options recited are available to use or select from.

What is claimed is:

1. A method of making a polyamide copolymer, the method comprising:
    subjecting a reaction mixture to conditions sufficient to form the polyamide copolymer, the reaction mixture comprising adduct A and adduct B, wherein
    adduct A is a 1:1 adduct of a diamine having the structure $H_2N—R^1—NH_2$, or a salt thereof, and an aliphatic diacid having the structure $HO—C(O)—R^2—C(O)—OH$, or a salt thereof,
    adduct B is a 1:1 adduct of the diamine having the structure $H_2N—R^1—NH_2$, or a salt thereof, and an aromatic diacid having the structure $HO—C(O)—R^3—C(O)—OH$, or a salt thereof,
    at each occurrence, $R^1$ is independently a substituted or unsubstituted $(C_1-C_{20})$alkylene,
    at each occurrence, $R^2$ is independently a substituted or unsubstituted $(C_1-C_{20})$alkylene,
    at each occurrence, $R^3$ is independently a substituted or unsubstituted $(C_6-C_{20})$arylene,
    the molar ratio of adduct A to adduct B in the reaction mixture is about 61:39 to about 90:10,
    the polyamide copolymer comprises repeating units having the structure:

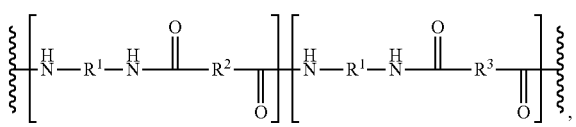

and the repeating units are in block or random configuration in the copolymer, wherein the subjecting of the reaction mixture to conditions sufficient to form the polyamide copolymer is performed in a reactor; and
    removing a majority of the polyamide copolymer from the reactor while leaving a minor amount of the polyamide copolymer on inner surfaces of the reactor and subsequently performing the subjecting of a reaction mixture to conditions sufficient to form the polyamide copolymer in the reactor again.

2. The method of claim 1, wherein the molar ratio of adduct A to adduct B in the reaction mixture is about 61:39 to about 85:15.

3. The method of claim 2, wherein the melting point of all of the polyamide copolymer formed during the method is less than or equal to about 300° C.

4. The method of claim 3, wherein the melting point of the polyamide copolymer is about 200° C. to about 300° C.

5. The method of claim 4, wherein $R^1$ is hexylene and the diamine is hexamethylenediamine.

6. The method of claim 5, wherein $R^2$ is butylene and the aliphatic diacid is adipic acid.

7. The method of claim 6, wherein $R^3$ is phenyl and the aromatic diacid is terephthalic acid.

8. The method of claim 7, wherein the polyamide copolymer comprises repeating units having the structure:

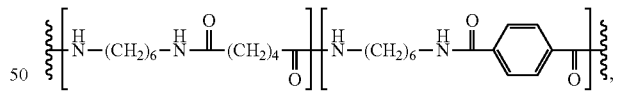

wherein repeating units are in block or random configuration in the copolymer.

9. The method of claim 8, wherein the polyamide copolymer has the structure:

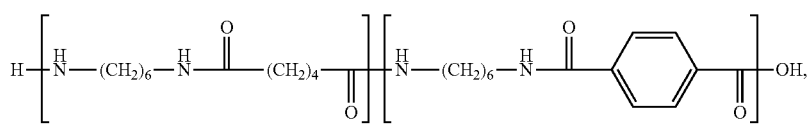

or a salt thereof, wherein repeating units are in block or random configuration in the copolymer.

10. The method of claim 1, wherein during the subsequent performance of the subjecting of a reaction mixture to conditions sufficient to form the polyamide copolymer in the reactor again, no polyamide copolymer remains unmelted, unhydrolyzed, undispersed, or a combination thereof, in the reactor.

11. The method of claim 1, wherein the subjecting of the reaction mixture to conditions sufficient to form the polyamide copolymer comprises removing water from the reaction mixture.

12. The method of claim 1, wherein the subjecting of the reaction mixture to conditions sufficient to form the polyamide copolymer comprises subjecting the reaction mixture to a temperature of about 200° C. to about 300° C.

13. A method of making a polyamide copolymer, the method comprising:
  subjecting a reaction mixture to conditions sufficient to form the polyamide copolymer, the reaction mixture comprising adduct A and adduct B, wherein
    adduct A is a 1:1 adduct of a diamine having the structure $H_2N—R^1—NH_2$, or a salt thereof, and an aliphatic diacid having the structure $HO—C(O)—R^2—C(O)—OH$, or a salt thereof,
    adduct B is a 1:1 adduct of the diamine having the structure $H_2N—R^1—NH_2$, or a salt thereof, and an aromatic diacid having the structure $HO—C(O)—R^3—C(O)—OH$, or a salt thereof,
    $R^1$ is hexylene and the diamine is hexamethylenediamine,
    $R^2$ is butylene and the aliphatic diacid is adipic acid,
    $R^3$ is phenyl and the aromatic diacid is terephthalic acid,
    the molar ratio of adduct A to adduct B in the reaction mixture is about 65:35 to about 75:25,
    the polyamide copolymer comprises repeating units having the structure:

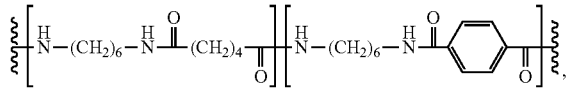

the repeating units are in block or random configuration in the copolymer, and
the melting point of all of the polyamide copolymer formed during the method is less than or equal to about 300° C., wherein the subjecting of the reaction mixture to conditions sufficient to form the polyamide copolymer is performed in a reactor; and
removing a majority of the polyamide copolymer from the reactor while leaving a minor amount of the polyamide copolymer on inner surfaces of the reactor and subsequently performing the subjecting of a reaction mixture to conditions sufficient to form the polyamide copolymer in the reactor again.

14. A polyamide copolymer produced from the subsequent performance of the subjecting of a reaction mixture to conditions sufficient to form the polyamide of claim 1, the polyamide copolymer comprising repeating units having the structure:

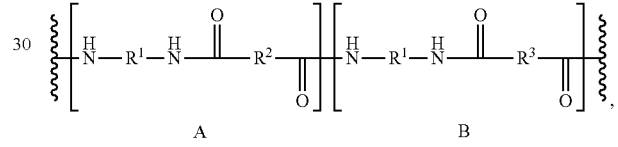

wherein
the molar ratio of repeating unit A to repeating unit B is about 61:39 to about 90:10, and
the melting point of the polyamide copolymer is less than or equal to about 300° C.

* * * * *